B. YAW & R. H. MITCHELL.
J. J. MITCHELL, Adm'r of R. H. Mitchell, dec'd.

Butter-Workers.

No. 158,820. Patented Jan. 19, 1875.

Witnesses:
Robert Wilson.
Josiah B. E. Herron.

R. H. Mitchell, dec'd
Inventors;
Benoni Yaw.
James J. Mitchell, Administrator
By Charles S. Herron, Atty.

UNITED STATES PATENT OFFICE.

BENONI YAW AND JAMES J. MITCHELL, (ADMINISTRATOR OF ROBERT H. MITCHELL, DECEASED,) OF NEW CONCORD, OHIO.

IMPROVEMENT IN BUTTER-WORKERS.

Specification forming part of Letters Patent No. 158,820, dated January 19, 1875; application filed June 22, 1874.

*To all whom it may concern:*

Be it known that BENONI YAW and ROBERT H. MITCHELL, of New Concord, in the county of Muskingum and State of Ohio, invented certain new and useful Improvements in Butter-Workers; and we do hereby declare the following to be a full, clear, and exact description thereof, reference being had to the accompanying drawing, and to the letters of reference marked thereon.

The nature of this invention consists in the construction and arrangement of a butter-worker, as will be hereinafter more fully set forth.

In order to enable others skilled in the art to which this invention appertains to make and use the same, we will now proceed to describe its construction and operation, referring to the annexed drawing, which forms a part of this specification, and in which—

Figure 1:
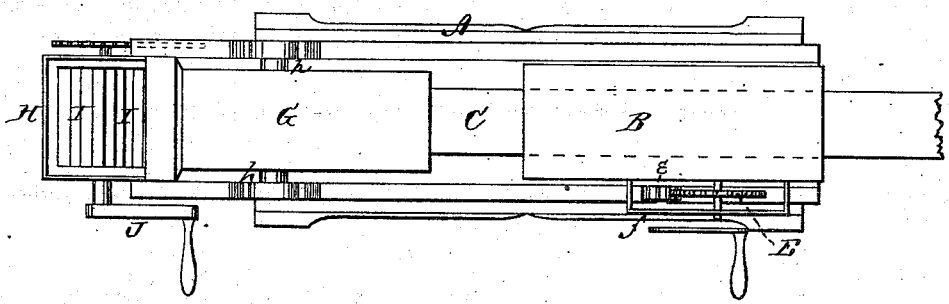
Figure 2:
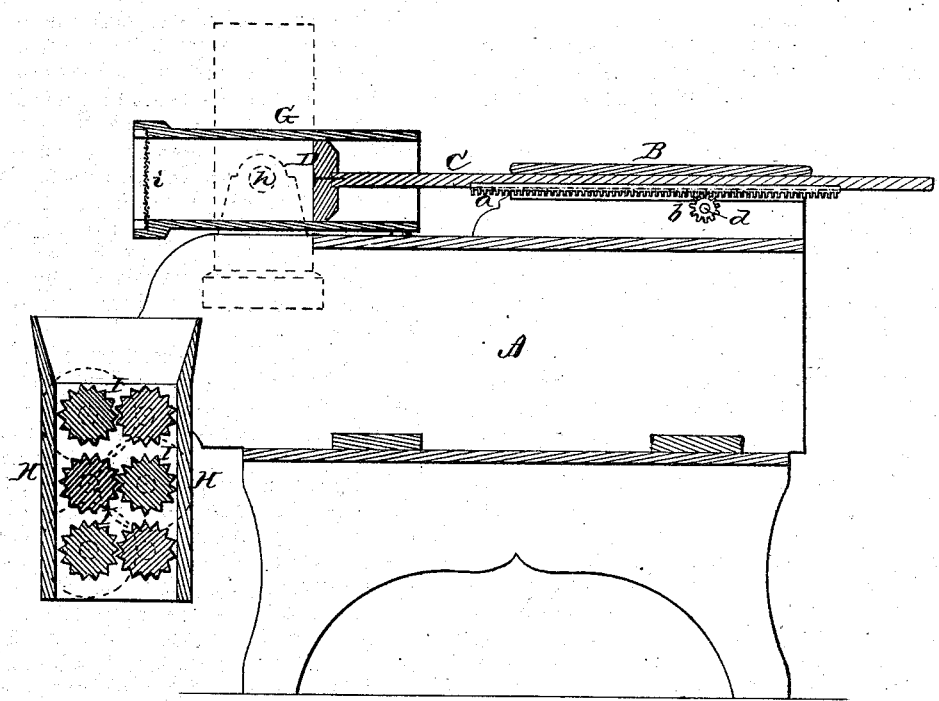

Figure 1 is a plan view, and Fig. 2 a longitudinal vertical section, of the improved butter-worker.

A represents the frame of the machine, which may be constructed in any suitable manner to contain the working parts of the machine. In the upper part of the frame A is formed a horizontal box, B, which acts as a guide for a slide, C, placed therein. This slide is, on its under side, provided with a rack-bar, $a$, into which gears a pinion, $b$. This pinion is secured on a shaft, $d$, passing transversely through the box B, and provided on one end with a cog-wheel, E, operated by means of a crank-shaft, $f$, and pinion $e$ thereon. On the inner end of the slide C is firmly secured a plunger, D, which fits and moves in a rectangular box, G. This box is hung upon trunnions or pivots $h\ h$, so that it can be placed in a horizontal position for the plunger to work in, or, when the plunger is withdrawn, in a vertical position to receive the butter. In that end of the box G which turns down is secured a wire-cloth sieve, $i$, as shown in Fig. 2. In the end of the frame A is secured a vertical box, H, open at both ends, and the upper end made hopper-shaped. In this box H are arranged two or more pairs of longitudinally-corrugated rollers, I, which run horizontally through the box, the rollers of each pair meshing into each other, and their journals connected by suitable gearing, so that, by turning a single crank, J, all the rollers will be revolved.

The operation of this machine is as follows: The plunger D being withdrawn from the box G, said box is turned in a vertical position and the butter to be worked placed therein. The box is then thrown back in a horizontal position, and the plunger, by means of its gearing, forced into the box G to press the butter against and through the sieve $i$. As the butter comes through this sieve it falls into the hopper-shaped box H, and when the rollers I therein are revolved the butter is thoroughly worked by passing through between them.

Having thus fully described this invention, what is claimed as new, and desired to be secured by Letters Patent, is—

1. The combination, in a butter-working machine, of a horizontally-operating plunger, D, and a pivoted box, G, provided with a wire-cloth sieve, $i$, at one end, through which the butter is pressed by the plunger, substantially as herein set forth.

2. The combination of the frame A B, slide C with plunger D, operated by the rack $a$ and gearing $b$ E $e$, the pivoted box G with sieve $i$, and the box H with rollers I, all constructed substantially as and for the purposes herein set forth.

BENONI YAW.
JAMES J. MITCHELL,
*Administrator of the estate of*
*Robert H. Mitchell, deceased.*

Witnesses:
J. HENRY TIMMS,
HENRY TIMMS.